United States Patent
Miyasaka

(10) Patent No.: US 10,889,658 B2
(45) Date of Patent: Jan. 12, 2021

(54) TIRE MANUFACTURING METHOD

(71) Applicant: TOYO TIRE & RUBBER CO., LTD., Itami (JP)

(72) Inventor: Takashi Miyasaka, Itami (JP)

(73) Assignee: TOYO TIRE CORPORATION, Itami (JP)

(*) Notice: Subject to any disclaimer, the term of this patent is extended or adjusted under 35 U.S.C. 154(b) by 565 days.

(21) Appl. No.: 15/704,125

(22) Filed: Sep. 14, 2017

(65) Prior Publication Data
US 2018/0105612 A1      Apr. 19, 2018

(30) Foreign Application Priority Data

Oct. 14, 2016   (JP) .................................. 2016-202791

(51) Int. Cl.
*C08C 1/14*        (2006.01)
*B60C 15/00*    (2006.01)
(Continued)

(52) U.S. Cl.
CPC ............ *C08C 1/14* (2013.01); *B29D 30/0662* (2013.01); *B29D 30/48* (2013.01);
(Continued)

(58) Field of Classification Search
CPC ...... C08C 1/14; B29D 30/0662; B29D 30/48; B29D 2030/486; B60C 15/00;
(Continued)

(56) References Cited

U.S. PATENT DOCUMENTS 5,725,702 A * 3/1998 Nakamura ............... B60C 15/06
                                                                     152/539
8,053,496 B1 * 11/2011 Minouchi ................ C08J 3/226
                                                                     523/351
(Continued)

FOREIGN PATENT DOCUMENTS

CN          101528450 A        9/2009
CN          102153765 A        8/2011
(Continued)

OTHER PUBLICATIONS

Yanagisawa Kazuhiro, JP-2006342262-A, machine translation. (Year: 2006).*

(Continued)

*Primary Examiner* — Robert C Dye
*Assistant Examiner* — Sedef E Paquette
(74) *Attorney, Agent, or Firm* — Westerman, Hattori, Daniels & Adrian, LLP

(57) ABSTRACT

A tire manufacturing method includes making a master batch, using the master batch to make a rubber composition, and making a green tire. The master batch is made wherein a carbon-black-containing pre-coagulation rubber latex is coagulated to obtain a coagulum; a compound according to Formula (I) is added to the water-containing coagulum;

(Continued)

wherein $R^1$ and $R^2$ each indicates a hydrogen atom, an alkyl group having 1 to 20 carbons, an alkenyl group having 1 to 20 carbons, or an alkynyl group having 1 to 20 carbons, $R^1$ and $R^2$ may be the same or different, and $M^+$ indicates sodium ion, potassium ion, or lithium ion; and the compound according to Formula (I) is dispersed within the coagulum. The green tire is provided with unvulcanized rubber sheeting made up of the rubber composition, chafer(s), carcass ply or plies, and bead filler(s).

3 Claims, 5 Drawing Sheets

(51) Int. Cl.
    *B29D 30/48*     (2006.01)
    *B60C 15/06*     (2006.01)
    *C08J 3/21*     (2006.01)
    *C08L 7/00*     (2006.01)
    *C08J 3/22*     (2006.01)
    *B29D 30/06*     (2006.01)
    *C08K 3/02*     (2006.01)
    *C08K 5/17*     (2006.01)
    *C08K 5/18*     (2006.01)
    *B60C 1/00*     (2006.01)

(52) U.S. Cl.
    CPC ...... *B60C 15/0027* (2013.01); *B60C 15/0635* (2013.01); *C08J 3/212* (2013.01); *C08J 3/22* (2013.01); *C08J 3/226* (2013.01); *C08K 3/02* (2013.01); *C08K 5/175* (2013.01); *C08K 5/18* (2013.01); *C08L 7/00* (2013.01); *B29D 2030/486* (2013.01); *B60C 2001/005* (2013.01); *B60C 2015/0614* (2013.01); *B60C 2015/0621* (2013.01); *B60C 2015/0625* (2013.01); *C08J 2307/02* (2013.01); *C08J 2407/02* (2013.01)

(58) Field of Classification Search
    CPC . B60C 15/0027; B60C 15/06; B60C 15/0628; B60C 15/0635; B60C 2001/005; B60C 2015/0614; B60C 2015/0617; B60C 2015/0621; B60C 2015/0625; B60C 2015/0642; C08J 3/212; C08J 3/22; C08J 3/226; C08J 2307/02; C08J 2407/02; C08K 3/02; C08K 5/175; C08K 5/18; C08L 7/00
    USPC ...................................................... 156/110.1
    See application file for complete search history.

(56) References Cited

U.S. PATENT DOCUMENTS

| | | |
|---|---|---|
| 2010/0276054 A1 | 11/2010 | Cereda et al. |
| 2010/0311898 A1* | 12/2010 | Yamada ................ C08K 3/04 524/575.5 |
| 2012/0277344 A1* | 11/2012 | Wang ..................... B29B 7/90 523/157 |
| 2014/0124113 A1 | 5/2014 | Miyazaki et al. |
| 2014/0128531 A1 | 5/2014 | Miyazaki et al. |
| 2016/0114633 A1 | 4/2016 | Miyasaka |

FOREIGN PATENT DOCUMENTS

| | | | |
|---|---|---|---|
| CN | 103804731 A | | 5/2014 |
| JP | 2006342262 A | * | 12/2006 |
| JP | 2014-95016 A | | 5/2014 |
| JP | 2016-083814 A | | 5/2016 |

OTHER PUBLICATIONS

Office Action dated Jul. 12, 2019, issued in counterpart CN Application No. 201710722938.8, with English translation. (17 pages).
Office Action dated Sep. 10, 2020, issued in counterpart JP Application No. 2016-202791, with English Translation. (10 pages).

* cited by examiner

TIRE MANUFACTURING METHOD

TECHNICAL FIELD

The present disclosure relates to a tire manufacturing method.

BACKGROUND ART

Patent Reference No. 1 discloses a method in which (2Z)-4-[(4-aminophenyl)amino]-4-oxo-2-butene acid sodium and carbon black are placed in a Banbury mixer and kneaded with rubber (hereinafter "prior manufacturing method"). Regarding (2Z)-4-[(4-aminophenyl)amino]-4-oxo-2-butene acid sodium. Patent Reference No. 1 further discloses that the terminal nitrogen functional group bonds to carbon black and that the carbon-carbon double-bond portion bonds to polymer.

PRIOR ART REFERENCES

Patent References

Patent Reference No. 1: Japanese Patent Application Publication Kokai No. 2014-95016

SUMMARY OF INVENTION

Means for Solving Problem

A first tire manufacturing method in accordance with the present disclosure comprises an operation in which a master batch is made, an operation in which the master batch is used to make a rubber composition, and an operation in which a green tire is made. The operation in which the master batch is made comprises an operation in which a carbon-black-containing pre-coagulation rubber latex is coagulated to obtain a coagulum; an operation in which a compound according to Formula (I) (hereinafter "compound according to formula (I)"), below, is added to the water-containing coagulum; and an operation in which the compound according to Formula (I) is dispersed within the coagulum. The green tire is provided with unvulcanized rubber sheeting made up of the rubber composition, chafer(s), carcass ply or plies, and bead filler(s). At the green tire, a carcass ply comprises a turn up which is disposed at a location toward the exterior in the tire width direction from the bead filler. At the green tire, a chafer comprises a chafer end which is disposed at a location toward the exterior in the tire width direction from the turnup. At the green tire, unvulcanized rubber shooting comprises a connecting portion which is disposed at a location between the chafer end and the turnup.

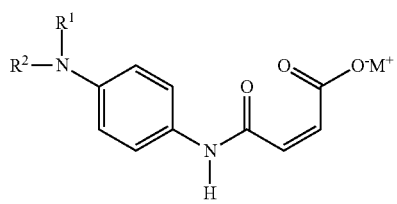

(I)

(At Formula (I), $R^1$ and $R^2$ each indicates a hydrogen atom, and alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

A second tire manufacturing method in accordance with the present disclosure comprises an operation in which a master batch is made, an operation in which the master batch is used to make a rubber composition, and an operation in which a green tire is made. The operation in which the master batch is made comprises an operation in which a compound according to Formula (I) is added to a mixture comprising carbon black and rubber, and an operation in which the compound according to Formula (I) is dispersed within the mixture in the presence of water. The green tire is provided with unvulcanized rubber sheeting made up of the rubber composition, chafer(s), carcass ply of plies, and bead filler(s). At the green tire, a carcass ply comprises a turnup which is disposed at a location toward the exterior in the tire width direction from the bead filler. At the green tire, a chafer comprises a chafer end which is disposed at a location toward the exterior in the tire width direction from the turnup. At the green tire, unvulcanized rubber sheeting comprises a connecting portion which is disposed at a location between the chafer end and the turnup.

EMBODIMENTS FOR CARRYING OUT INVENTION

Figure 1:
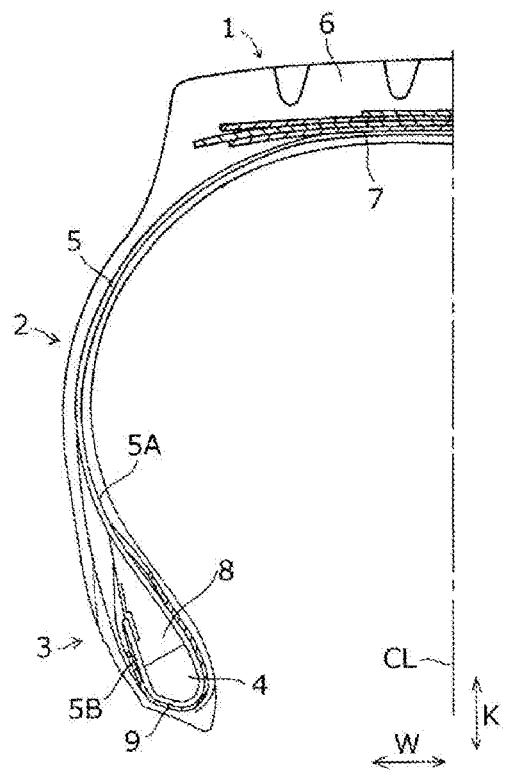
FIG. 1 Schematic half-sectional diagram of a tire at a first embodiment.

While a chafer layer is sometimes employed at the carcass ply turnup to reinforce the tire bead, the end of the chafer is susceptible to failure.

The present disclosure provides a tire manufacturing method capable of inhibiting chafer and separation.

A first tire manufacturing method comprises an operation in which a master batch is made, an operation in which the master batch is used to make a rubber composition, and an operation in which a green tire is made. The operation in which the master batch is made comprises an operation in which a carbon-black-containing pre-coagulation rubber latex is coagulated to obtain a coagulum; an operation in which a compound according to Formula (I) is added to the water-containing coagulum; and an operation in which the compound according to Formula (I) is dispersed within the coagulum. The green tire is provided with unvulcanized rubber sheeting made up of the rubber composition, chafer(s), carcass ply or plies, and bead filler(s). At the green tire, a carcass ply comprises a turnup which is disposed at a location toward the exterior in the tire width direction from the bead filler. At the green tire, a chafer comprises a chafer end which is disposed at a location toward the exterior in the tire width direction from the turnup. At the green tire, unvulcanized rubber sheeting comprises a connecting portion which is disposed at a location between the chafer end and the turnup.

The first tire manufacturing method permits inhibition of chafer end separation. This is because, at a tire obtained using the first tire manufacturing method, rubber sheeting having excellent fatigue resistance is present, and carbon black is dispensed to a high degree, at a location between the carcass ply turnup and the chafer end which is disposed at a location toward the exterior in the tire width direction therefrom.

The reason that fatigue resistance of the rubber sheeting can be improved is because the first tire manufacturing method permits a high degree of dispersal of the compound according to Formula (I). Because the compound according to Formula (I) is hydrophilic and because rubber is its dried state is hydrophobic, the compound according to Formula (I) tends not to be easily dispersed by the prior manufacturing method. In contrast, with the first tire manufacturing method, the water content of the coagulum may facilitate dispersal of the compound according to Formula (I). The first tire manufacturing method is therefore more capable of improving the dispersion characteristics of the compound according to Formula (I) than the prior manufacturing method, and is capable of improving resistance of rubber sheeting to failure due to fatigue related to local strain.

The reason that carbon black can be dispersed to a high degree is because the first tire manufacturing method employs a procedure in which carbon-black-containing pre-coagulation rubber latex is coagulated to obtain a coagulum.

Moreover, the first tire manufacturing method is capable of inhibiting changes in properties that might otherwise occur with passage of long periods of time. This is so because the first tire manufacturing method makes it possible for the compound according to Formula (I) and rubber originating from the master batch to be efficiently reacted in the presence of water.

At the first tire manufacturing method, it is preferred that the operation in which the compound according to Formula (I) is dispersed within the coagulum be an operation in which the compound according to Formula (I) is dispersed within the coagulum as the coagulum is being dewatered.

At the first tire manufacturing method, at the operation in which the compound according to Formula (I) is added to the coagulum, taking the amount of water in the pre-addition-of-compound-according-to-Formula-(I) coagulum for every 100 parts by mass of the pre-addition-of-compound-according to Formula (I) that is added for every 100 parts by mass of the pre-addition-of-compound-according-to-Formula-(I) coagulum to be Wb, it is preferred that the ratio of Wa to Wb (i.e., Wa/Wb) be in the range 1 to 8100.

It is preferred that thickness of the unvulcanized rubber sheeting be not less than 0.1 mm.

At the first manufacturing method, the operation in which the master batch is made may further comprise, prior to the operation in which carbon-black-containing pre-coagulation rubber latex is coagulated to obtain a coagulum, an operation in which carbon black and a first rubber latex are mixed to obtain a carbon black slurry, and an operation in which the carbon black slurry and a second rubber latex are mixed to obtain the pre-coagulation rubber latex.

A second tire manufacturing method comprises an operation in which a master batch is made, an operation in which the master batch is used to make a rubber composition, and an operation in which a green tire is made. The operation in which the master batch is made comprises an operation in which a compound according to Formula (I) is added to a mixture comprising carbon black and rubber, and an operation in which the compound according to Formula (I) is dispersed within the mixture in the presence of water. The green tire is provided with unvulcanized rubber sheeting made up of the rubber composition, chafer(s), carcass ply or plies, and bead filler(s). At the green tire, a carcass ply comprises a turnup which is disposed at a location toward the exterior in the tire width direction from the bead filler. At the green tire, a chafer comprises a chafer end which is disposed at a location toward the exterior in the tire width direction from the turnup. At the green tire, unvulcanized rubber sheeting comprises a connecting portion which is disposed at a location between the chafer end and the turnup.

The second tire manufacturing method permits inhibition of chafer end separation. This is because, at a tire obtained using the second tire manufacturing method, rubber sheeting having excellent fatigue resistance is disposed at a location between the carcass ply turnup and the chafer end which is disposed at a location toward the exterior in the tire width direction therefrom.

The reason that fatigue resistance of the rubber sheeting can be improved is because the second tire manufacturing method permits a high degree of dispersal of the compound according to Formula (I), Because the compound according to Formula (I) is hydrophilic and because rubber in its dried state is hydrophobic, the compound according to Formula (I) tends not to be easily dispersed by the prior manufacturing method. In contradistinction thereto, at the second tire manufacturing method, dispersal of the compound according to Formula (I) may be facilitated by water. The second tire manufacturing method is therefore more capable of improving the dispersion characteristics of the compound according to Formula (I) than the prior manufacturing method, and is capable of improving resistance of rubber sheeting to failure due to fatigue related to local strain.

A tire manufacturing method in accordance with a first embodiment comprises an operation in which carbon black and rubber latex are mixed to obtain a carbon black slurry. Mixing the carbon black and the rubber latex makes it is possible to prevent reflocculation of carbon black. This is thought to be due to formation of an extremely thin latex phase on all or part of the surface of the carbon black, the latex phase inhibiting reflocculation of carbon black. As examples of the carbon black, besides SAF, ISAF, HAF, FEF, GPF, and other such carbon blacks ordinarily used in the rubber industry, acetylene black, Ketchen black, and/or other such electrically conductive carbon blacks may be used. The carbon black may be nongranulated carbon black or may be granulated carbon black that has been granulated based upon considerations related to the handling characteristics thereof as is ordinary practice in the rubber industry. The rubber latex at the operation in which the carbon black slurry is made may for example be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that solids (rubber) concentration in the rubber latex be not less than 0.1 mass %, more preferred that this be not less than 0.2 mass %, and still more preferred that this be not less than 0.3 mass %. The upper limit of the range in values for the solids concentration might, for example, be 5 mass %, it is being preferred that this be 2 mass %, and it being more preferred that this be 1 mass %. The carbon black and the rubber latex may be mixed using a high-shear mixture, high shear mixture, homomixer, ball mill, bead mill, high-pressure homogenizer, ultrasonic homogenizer, colloid mill, and/or other such ordinary disperser.

In the carbon black slurry, carbon black is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %.

The tire manufacturing method in accordance with the first embodiment further comprises an operation in which the carbon black slurry and rubber latex are mixed to obtain pre-coagulation rubber latex. The rubber latex for mixture with the carbon black slurry may for example be natural rubber latex, synthetic rubber latex, and/or the like. It is preferred that the solids concentration of the rubber latex for mixture with the carbon black slurry be greater than the solids concentration of the rubber latex at the operation in which the carbon black slurry is made. It is preferred that the solids concentration of the rubber latex for mixture with the carbon black slurry be not less than 10 mass %, and more preferred that this be not less than 20 mass %. The upper limit of the range in values for the solids concentration at the rubber latex might, for example, be 60 mass %, it being preferred that this be 40 mass %, and it being more preferred that this be 30 mass %. The carbon black slurry and the rubber latex may be mixed using a high-shear mixer, high shear mixer, homomixer, ball mill, bead mill, high-pressure homogenizer, ultrasonic homogenizer, colloid mill, and/or other such ordinary disperser.

In the pre-coagulation rubber latex, rubber particles, carbon black, and so forth are dispersed in water.

The tire manufacturing method in accordance with the first embodiment further comprises an operation in which the pre-coagulation rubber latex is coagulated to obtain a coagulum. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water.

The tire manufacturing method in accordance with the first embodiment further comprises an operation in which a compound according to Formula (I) is added to the coagulum. At the operation in which the compound according to Formula (I) is added, the amount Wa of water in the coagulum might, for example, be not less than 1 part by mass, it being preferred that this be not less than 10 parts by mass, for every 100 parts by mass of rubber within the coagulum. The upper limit of the range in values for Wa might, for example, be 800 parts by mass, it being preferred that this be 600 parts by mass. The amount Wb of compound according to Formula (I) that is added might, for example, be not less than 0.1 part be mass, it being preferred that this be not less than 0.5 part by mass, for every 100 parts by mass of rubber within the coagulum. The upper limit of the range in values for Wb might, for example, be 10 parts by mass, it being preferred that this be 5 parts by mass. It is preferred that the ratio of Wa to Wb (i.e., Wa/Wb) be in the range 1 to 8100. Causing Wa/Wb to be less than 1 would be unlikely to produce much benefit in terms of improvement of fatigue resistance. Above 8100, it might be the case that the water content of the coagulum will remain in the master batch.

Formula (I) is indicated below.

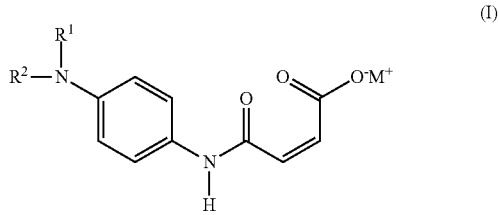

(At Formula (I), $R^1$ and $R^2$ each indicates a hydrogen atom, an alkyl group having 1 to 20 carbons, and alkenyl group having 1 to 20 carbons, or an alkynyl group having 1 to 20 carbons. $R^1$ and $R^2$ may be the same or different. $M^+$ indicates sodium ion, potassium ion, or lithium ion.)

At Formula (I), it is preferred that $R^1$ and $R^2$ each be a hydrogen atom. It is preferred that $M^+$ be a sodium ion. It is preferred that the compound according to Formula (I) be a compound according to Formula (I'), below.

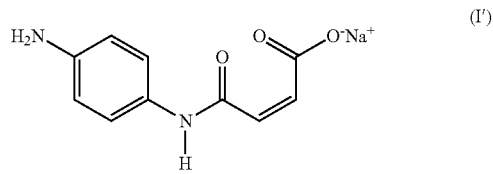

The tire manufacturing method in accordance with the first embodiment further comprises an operation in which the compound according to Formula (I) is dispersed within the coagulum. The operation in which the compound according to Formula (I) is dispersed within the coagulum might, for example, be an operation in which the compound according to Formula (I) is dispersed within the coagulum as the post-addition-of-compound-according-to-Formula-(I) coagulum is being dewatered; more specifically, this might be an operation in which the compound according to Formula (I) is dispersed within the coagulum as a shear force is imparted at 100° C. to 250° C. to the post-addition-of-compound-according-to-Formula-(I) coagulum. It is preferred that the lower limit of the range in values for temperature be 120° C. It is preferred that the upper limit of the range in values for temperature be 230° C. A single screw extruder or other such extruder may be used for dispersing the compound according to Formula (I) within the coagulum.

The tire manufacturing method in accordance with the first embodiment further comprises an operation in which, following dispersal of the compound according to Formula (I), drying and plasticization of the coagulum are carried out to obtain a master batch.

The master batch comprises rubber. The rubber might, for example, be natural rubber, polyisoprene rubber, styrene-butadiene rubber, polybutadiene rubber, nitrile rubber, chloroprene rubber, and/or the like. It is preferred that the amount of natural rubber in the master batch be not less than 70 mass %, more preferred that this be not less than 80 mass %, still more preferred that this be not less than 90 mass %, and still more preferred that this be 100 mass %, per 100 mass % of the rubber.

The master batch further comprises carbon black. For every 100 parts by mass of the rubber, it is preferred that the amount of carbon black be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass.

The master batch further comprises a compound according to Formula (I). For every 100 parts by mass of the rubber, it is preferred that the amount of the compound according to Formula (I) be not less than 0.1 part by mass, and more preferred that this be not less than 0.5 part by mass. For every 100 parts by mass of the rubber, it is preferred that the amount of the compound according to Formula (I) be not greater than 10 parts by mass, and more preferred that this be not greater than 8 parts by mass.

The tire manufacturing method in accordance with the first embodiment further comprises an operation in which master batch and compounding ingredient(s) are dry-blended in a mixer to obtain a mixture. The compounding ingredient(s) might, for example, be zinc oxide, antioxidant, phenolic thermosetting resin, methylene donor, and/or the like. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. As the mixer, internal mixers, open roll mills, and the like may be cited as examples. As an internal mixer, Banbury mixers, kneaders, and the like by be cited as examples.

As examples of the phenolic thermosetting resin that may serve as compounding ingredient, compounds produced using formaldehyde or other such aldehyde to cause condensation of phenol, resorcinol, or an alkyl derivative of either of these or the like, and/or other such phenolic compounds may be cited. Alkyl derivatives include cresols, xylenols, nonylphenols, octylphenols, and so forth. As specific examples of phenolic thermosetting resin, unmodified phenolic resins condensed from formaldehyde and phenol; alkyl-substituted phenolic resins condensed from formaldehyde and cresol, xylenol, or other such alkylphenol; resorcinol-formaldehyde resins condensed from formaldehyde and resorcinol; resorcinol-alkylphenol co-condensed formaldehyde resins condensed from resorcinol and alkylphenol and formaldehyde, and/or any other among the various types of novolac-type phenolic resins may be cited.

As curing agent for phenolic thermosetting resin, hexamethylenetetramine and/or melamine derivative may be used as methylene donor for blending therein. As melamine derivative, hexamethoxymethylmelamine, hexamethylolmelaminepentamethyl ether, polyhydric methylolmelamine, and the like may be cited as examples.

The tire manufacturing method in accordance with the first embodiment further comprises an operation in which a vulcanizing-type compounding ingredient is added to the mixture, and in which the vulcanizing-type compounding ingredient is kneaded into the mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispensing sulfur, and the like may be cited as example. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises a rubber component that comprises natural rubber. It is preferred that the amount of natural rubber be not less than 70 mass %, more preferred that this be not less than 80 mass %, still more preferred that this be not less than 90 mass %, and still more preferred that this be 100 mass % per 100 mass % of the rubber component.

The rubber composition further comprises carbon black. For every 100 parts by mass of the rubber component, it is preferred that the amount of carbon black be not less than 10 parts by mass, more preferred that this be not less than 20 parts by mass, and still more preferred that this be not less than 30 parts by mass. For every 100 parts by mass of the rubber component, it is preferred that the amount of carbon black be not greater than 80 parts by mass, and more preferred that this be not greater than 60 parts by mass.

The rubber composition further comprises a compound according to Formula (I). For every 100 parts by mass of the rubber component, it is preferred that the amount of the compound according to Formula (I) be not less than 0.1 part by mass, and more preferred that this be not less than 0.5 part by mass. For every 100 parts by mass of the rubber component, it is preferred that the amount of the compound according to Formula (I) be not greater than 10 parts by mass, and more preferred that this be not greater than 8 parts by mass.

The rubber composition may further comprise zinc oxide, antioxidant, phenolic thermosetting resin, methylene donor, sulfur, vulcanization accelerator, and/or the like. For every 100 parts by mass of the rubber component, it is preferred that the amount of phenolic thermosetting resin be 0.5 part by mass to 10 parts by mass, and more preferred that this be 1 part by mass to 5 parts by mass. For every 100 parts by mass of the rubber component, it is preferred that the amount of melamine donor be 0.5 part by mass to 10 parts by mass, and more preferred that this be 1 part by mass to 5 parts by mass. It is preferred that the amount of the sulfur, expressed as equivalent sulfur content, be 0.5 part by mass to 5 parts by mass for every 100 parts by mass of the rubber component. It is preferred that the amount of the vulcanization accelerator be 0.1 part by mass to 5 parts by mass for every 100 parts by mass of the rubber component.

The tire manufacturing method in accordance with the first embodiment comprises an operation in which a green tire provided with unvulcanized rubber sheeting made up of the rubber composition is made, and in which this is vulcanized and molded to obtain tire. Vulcanization and molding of this unvulcanized rubber sheeting produces rubber sheeting 15, described below. Vulcanization and molding of this unvulcanized rubber sheeting may also produce rubber sheeting 16, rubber sheeting 17, rubber sheeting 18, rubber sheeting 19, rubber sheeting 20, and/or rubber padding 14, described below. Thickness of the unvulcanized rubber sheeting might, for example, be not less than 0.1 mm, it being preferred that this be not less that 0.3 mm, and more preferred that this be not less than 0.5 mm. The upper limit of the range in values for thickness might, for example, be 5 mm, it being preferred that this be 2 mm. It is preferred that the tire be a tire intended for heavy loads. The tire may be pneumatic tire.

FIG. 1 shows a half-section of a tire. At FIG. 1, CL indicates the tire equator, K indicates the tire radial direction, and W indicates the tire width direction. The tire width direction is the same as the tire axial direction. The tire may possess a construction that is bilaterally symmetric with respect to the tire equator CL.

The tire comprises a tread 1; left and right, i.e., a pair of sidewalls 2 that extend toward the interior in the tire radial direction from either end of the tread 1; and left and right, i.e., a pair of beads 3 that are disposed at locations toward the interior in the tire radial direction from the sidewalls 2. Disposed in embedded fashion at each bead 3 is an annular bead core 4.

The tire is provided with at least one carcass ply 5 that is toroidal in shape and that is disposed between the pair of bead cores 4. Carcass ply 5 extends form tread 1 and passes through sidewall 2 to reach bead 3, and is turned up so as to fold back upon itself as it goes around bead core 4. Carcass ply 5 comprises main body 5A that extends from trend 1 and passes through sidewall 2 to reach a location toward the interior from bead core 4 in the tire width direction. Carcass ply 5 comprises turnup 5B that extends from a location toward the interior from bead core 4 in the tire radial direction and passes through a location toward the exterior from bead core 4 in the tire width direction to reach a location toward the exterior from bead filler 8 in the tire width direction. Turnup 5B comprises turnup end 5E which is disposed at a location toward the exterior from bead filler 8 in the tire width direction. Carcass ply 5 is provided with carcass cord(s) made up of steel cord(s), organic fiber cord(s), and/or the like and with rubber covering(s) that cover the carcass cord(s). The carcass cord(s) are arranged so as to be substantially perpendicular to the tire circumferential direction.

The tire is provided with a belt 7 that is made up of at least two belt plies and that is disposed between tread rubber 6 and carcass ply 5.

Figure 2:
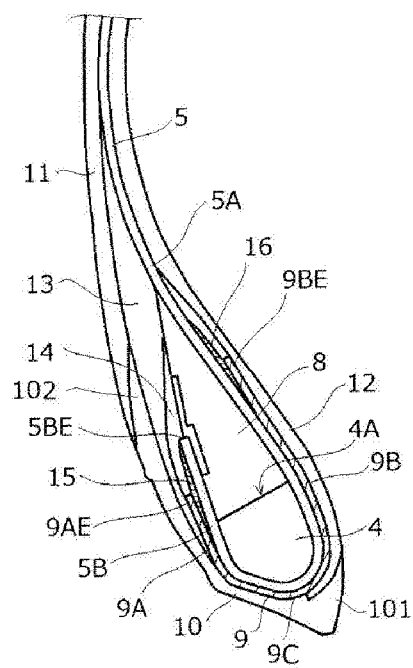
FIG. 2 Partial enlarged sectional diagram showing a bead portion in the tire at the first embodiment.

As shown in FIG. 2, each bead 3 is provided with a bead filler 8 that is disposed between main body 5A and turnup 5B of carcass ply 5. Bead filler 8 is disposed at a location toward the exterior from bead core 4 in the tire radial direction. Bead filler 8 has a triangular cross-section. The cross-sectional shape of bead filler 8 is such that width of bead filler 8 gradually decreases as one proceeds toward the exterior in the tire radial direction. Bead filler 8 may be made up of hard rubber.

Each bead 3 is provided with chafer(s) 9. Chafer 9 extends from a location toward the interior from bead filler 8 in the tire width direction and passes through a location toward the interior from bead core 4 in the tire radial direction to reach a location toward the exterior from bead filler 8 in the tire width direction. Chafer 9 comprises upturned portion 9A (hereinafter "outer upturned portion 9A") which is disposed at a location toward the exterior in the tire width direction from turnup 5B. Outer upturned portion 9A comprises chafer end 9AE which is disposed at a location toward the exterior in the tire width direction from turnup 5B. Chafer 9 comprises upturned portion 9B (hereinafter "inner upturned portion 9B") which is disposed at a location toward the interior in the tire width direction from bead filler 8. Inner upturned portion 9B comprises chafer end 9BE which is disposed at a location toward the interior in the tire width direction from bead filler 8. Chafer 9 comprises portion 9C which is disposed at a location toward the interior in the tire radial direction from bead core 4. Portion 9C is layered over carcass ply 5. Chafer 9 may be provided with steel cord(s), organic fiber cord(s), and/or other such reinforcing cord(s) and with rubber that covers the reinforcing cord(s).

Each bead 3 is provided with rubber chafer(s) 10. Rubber chafer 10 extends from location in the vicinity of a location toward the interior from head cord 4 in the tire redial direction and passes through a location toward the exterior from bead core 4 in the tire width direction to reach a location toward the exterior from bead filler 8 in the tire width direction. The two ends of rubber chafer 10 may be defined as first end 101 which comes in contact with innerliner 12, and second end 102 which comes in contact with sidewall rubber 11. When the tire is mounted on a standard rim, rubber chafer 10 comes in contact with the rim flange. Rubber chafer 10 is sometimes referred to as a rim strip.

The tire is provided with innerliner(s) 12 which covers the inner surface of carcass ply 5 at sidewall(s) 2 and tread 1. Innerliner 12 extends from tread 1 and passes through sidewall 2 to reach bead 3. Innerliner 12 covers inner upturned portion 9B at a location toward the interior from inner upturned portion 9B in the tire width direction. Innerliner 12 comprises an innerliner end at a location toward the interior from bead core 4 in the tire radial direction. The inner liner end is disposed at a location between rubber chafer 10 and portion 9C of chafer 9. The innerliner end is covered by rubber chafer 10.

The tire is provided with padding 13 which is made of rubber end which is disposed at a location between bead filler 8 and the boundary between the end of sidewall rubber 11 and second end 102 of rubber chafer 10. Padding 13 extends from the overlapping ends of carcass ply 5 and sidewall rubber 11 to the overlapping ends of rubber chafer 10 and chafer 9. Padding 13 covers chafer end 9AE at a location toward the exterior from chafer end 9AE in the tire width direction.

The tire is provided with rubber padding 14 which is disposed at a location toward the exterior in the tire radial direction from chafer end 9AE. Rubber padding 14 extends from a location toward the exterior in the tire radial direction from chafer end 9AE to a location toward the interior in the tire width direction from second end 102. Rubber padding 14 extends from the overlapping ends of chafer 9 and rubber sheeting 15 to the overlapping ends of bead filler 8 and padding 13.

Figure 3:
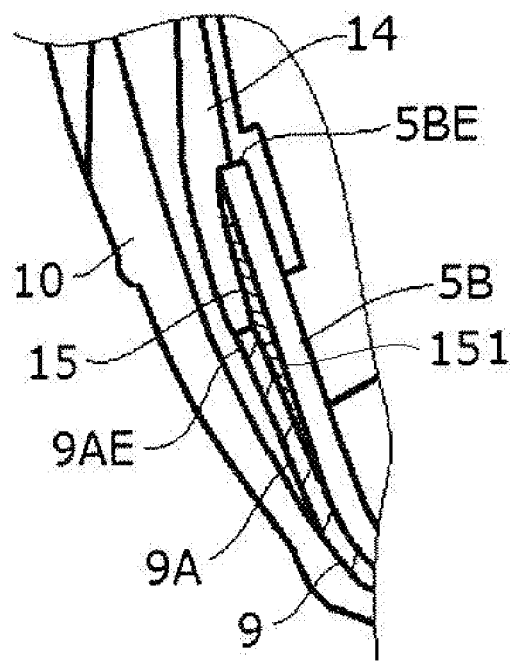
FIG. 3 Enlarged sectional diagram showing a region surrounding a rubber sheet in the tire at the first embodiment.
Figure 4:
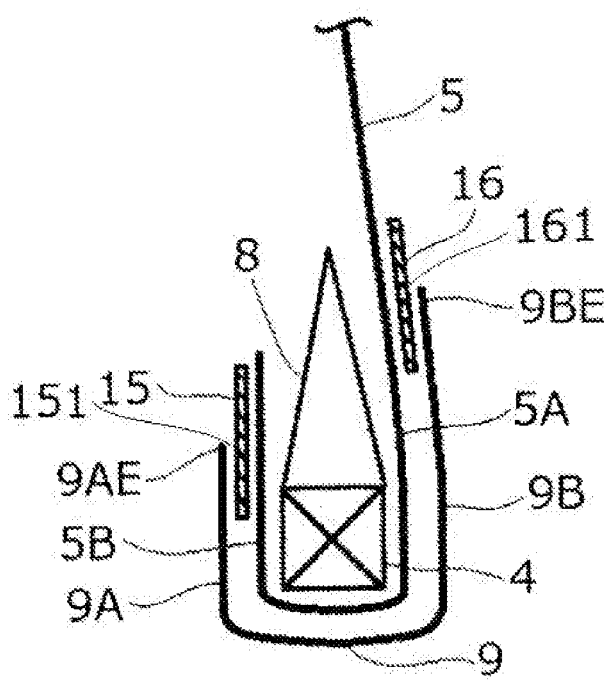
FIG. 4 Conceptual diagram of a bead portion in the tire at the first embodiment.

As shown in FIGS. 3 and 4, the tire is provided with rubber sheeting 15 that comprises connecting portion 151 which is disposed at a location between chafer end 9AE and turnup 5B. Connecting portion 151 connects turnup 5B and chafer end 9AE. Rubber sheeting 15 extends in parallel fashion with respect to turnup 5B so as to be directed toward the exterior in the tire radial direction from the overlapping ends of chafer 9 and carcass ply 5, which are disposed at locations toward the exterior in the tire width direction from bead core 4. The two ends of rubber sheeting 15 may be defined as a first end which comes in contact with the overlapping ends of chafer 9 and carcass ply 5, and a second end which comes in contact with turnup end 5BE. Thickness of rubber sheeting 15 might, for example, be not less than 0.1 mm, it being preferred that this be not less than 0.3 mm, and more preferred that this be not less than 0.5 mm. The upper limit of the range in values for thickness might, for example, be 5 mm, it being preferred that this be 2 mm. Rubber sheeting 15 serves to inhibit separation of chafer end 9AE.

The tire provided with rubber sheeting 16 that comprises connecting portion 161 which is disposed at a location between chafer end 9BE and main body 5A. Connecting portion 161 connects main body 5A and chafer end 9BE. Rubber sheeting 16 serves to inhibit separation of chafer end 9BE.

Figure 5:
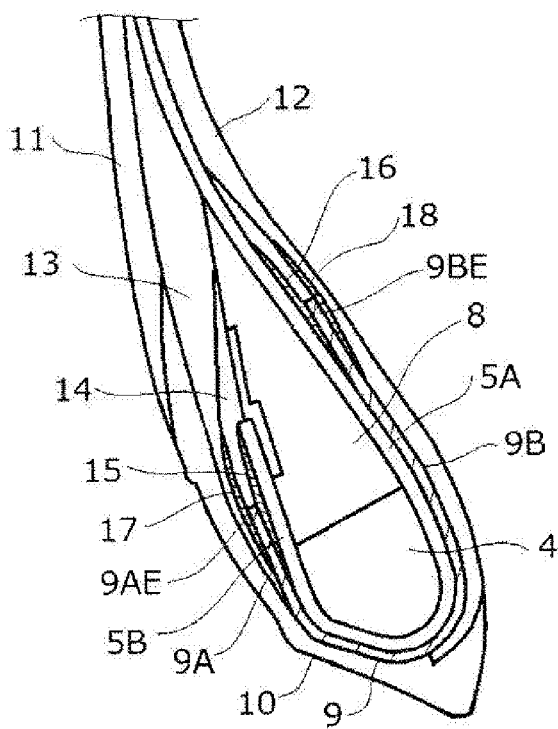
FIG. 5 Partial enlarged sectional diagram showing a bead portion in a tire at a first variation.
Figure 6:
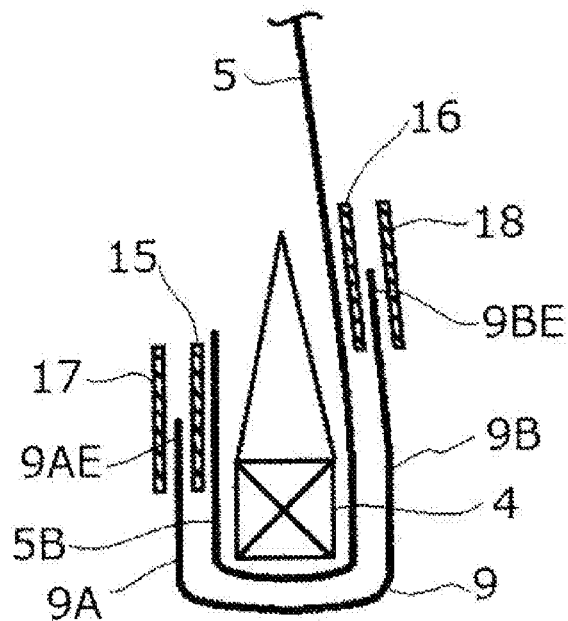
FIG. 6 Conceptual diagram of a bead portion in the tire at the first variation.

As shown in FIGS. 5 and 6, a tire in accordance with a first variation on the first embodiment further comprises rubber sheeting 17 and rubber sheeting 18. Rubber sheeting 17 is disposed at a location toward the exterior in the tire width direction from rubber sheeting 15. Rubber sheeting 17 extends from the overlapping ends of chafer 9 and padding 13 to the overlapping ends of rubber padding 14 and padding 13. Chafer end 9AE is disposed at a location between rubber sheeting 17 and rubber sheeting 15. Rubber sheeting 17 serves to inhibit separation of chafer end 9AE. Rubber sheeting 17 serves to inhibit separation of chafer end 9AE. Rubber sheeting 18 is disposed at a location toward the interior in the tire width direction from rubber sheeting 16. Chafer end 9BE is disposed at a location between rubber sheeting 18 and rubber sheeting 16. Rubber sheeting 18 serves to inhibit separation of chafer end 9BE.

Figure 7:
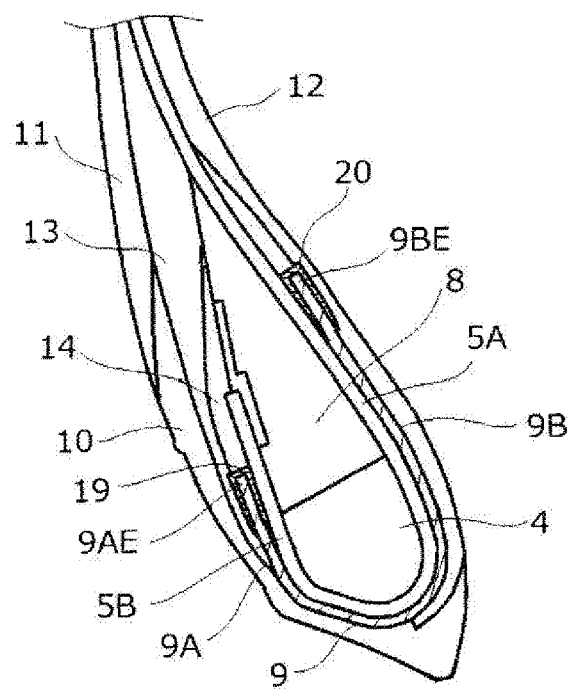
FIG. 7 Partial enlarged sectional diagram showing a bead portion in a tire at a second variation.
Figure 8:
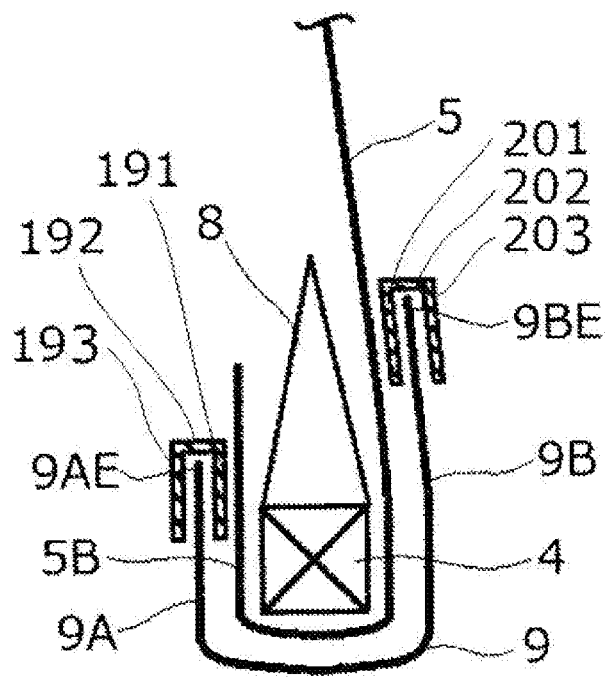
FIG. 8 Conceptual diagram of a bead portion in the tire at the second variation.

As shown in FIGS. 7 and 8, a tire in accordance with a second variation on the first embodiment is provided with rubber sheeting 19 and rubber sheeting 20 instead of rubber sheeting 15 and rubber sheeting 16. Rubber sheeting 19 comprises connecting portion 191 which is disposed at a location between chafer end 9AE and turnup 5B; intermediate portion 192 which is disposed at a location toward the exterior in the tire radial direction from chafer end 9AE; and second connecting portion 193 which is disposed at a location toward the exterior in the tire width direction from chafer end 9AE. Rubber sheeting 19 serves to inhibit separation of chafer end 9AE. Rubber sheeting 20 comprises first connecting portion 201 which is disposed at a location between chafer end 9BE and main body 5A; intermediate portion 202 which is disposed at a location toward the exterior in the tire radial direction from chafer end 9BE; and second connecting portion 203 which is disposed at a location between innerliner 12 and chafer end 9BE. Rubber sheeting 16 serves to inhibit separation of chafer end 9BE.

Figure 9:
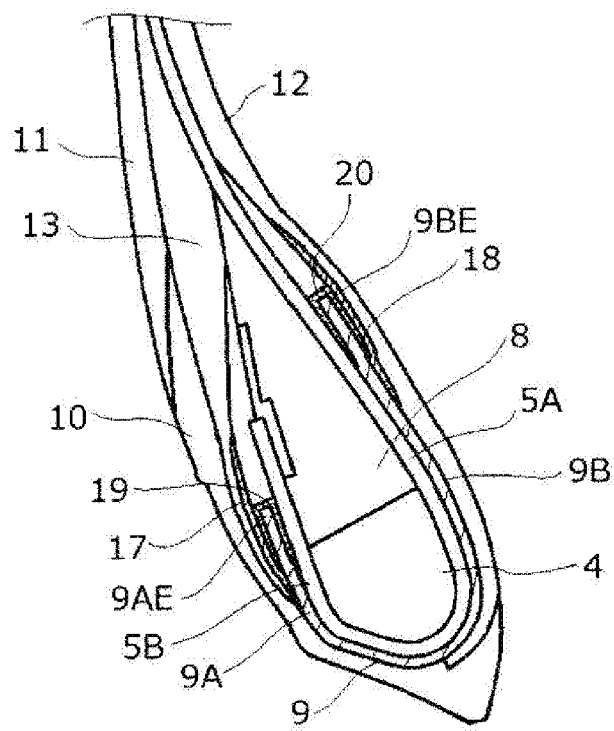
FIG. 9 Partial enlarged sectional diagram showing a bead portion in a tire at a third variation.
Figure 10:
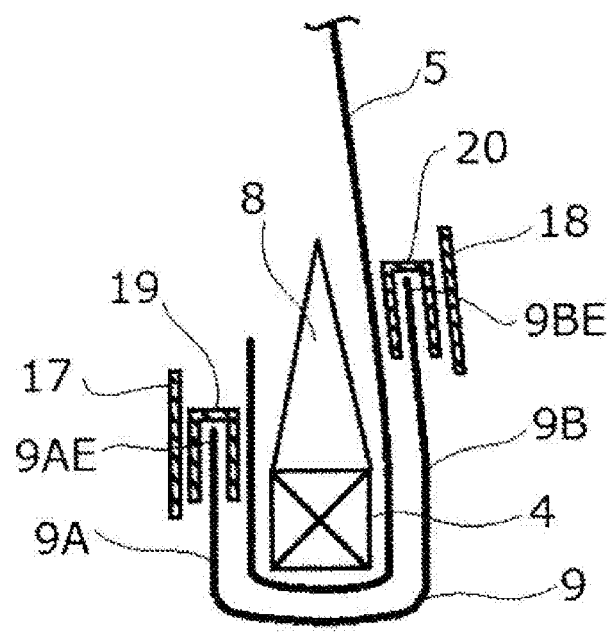
FIG. 10 Conceptual diagram of a bead portion in the tire at the third variation.

As shown in FIGS. 9 and 10, a tire in accordance with a third variation on the first embodiment is provided with rubber sheeting 19 and rubber sheeting 20, and is further provided with rubber sheeting 17 and rubber sheeting 18, instead of rubber sheeting 15 and rubber sheeting 16. Rubber sheeting 17 is disposed at a location toward the exterior in the tire width direction from rubber sheeting 19. Rubber sheeting 17 comes in contact with rubber sheeting 19. Rubber sheeting 17 extends from the overlapping ends of chafer 9 and padding 13 to the overlapping ends of rubber padding 14 and padding 13. Rubber sheeting 18 is disposed at a location toward the interior in the tire width direction from rubber sheeting 20. Rubber sheeting 18 comes in contact with rubber sheeting 20.

Whereas the tire obtained using the method in accordance with the first embodiment was provided with rubber sheeting 16, a tire in accordance with a fourth variation is not provided with rubber sheeting 16.

Whereas the tire manufacturing method in accordance with the first embodiment comprised an operation in which carbon black and rubber latex were mixed to obtain a carbon black slurry, a fifth variation comprises, instead of that operation, an operation in which carbon black and water are mixed to obtain a carbon black slurry.

A tire manufacturing method in accordance with a second embodiment comprises an operation in which a compound according to Formula (I) is added to a mixture comprising carbon black and rubber. For every 100 parts by mass of the rubber, it is preferred that the amount of carbon black in the mixture be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass. The rubber might, for example, be natural rubber, styrene-butadiene rubber, nitrile rubber, chloroprene rubber, and/or the like. It is preferred that the amount of natural rubber be not less than 70 mass %, more preferred that this be not less than 80 mass %, still more preferred that this be not less than 90 mass %, and still more preferred that this be 100 mass %, per 100 mass % of rubber. The amount of the compound according to Formula (I) that is added might, for example, be 0.1 part by mass to parts by mass for every 100 parts by mass of rubber within the mixture.

The tire manufacturing method in accordance with the second embodiment further comprises an operation in which the compound according to Formula (I) is dispersed within the mixture in the presence of water to obtain a master batch. The amount of water in the mixture might, for example, be not less than 1 part by mass, it being preferred that this be not less than 10 parts by mass, for every 100 parts by mass of rubber within the mixture. The upper limit of the range in values for the amount of water in the mixture might, for example, be 800 parts by mass, it being preferred that this be 600 parts by mass regarding the master batch, the description given at the first embodiment is incorporated here.

The tire manufacturing method in accordance with the second embodiment further comprises an operation in which master batch and compounding ingredient(s) are dry-blended in a mixer to obtain a pre-addition-of-vulcanizing-type-compounding-ingredient mixture. Regarding this, the description given at the first embodiment is incorporated here.

The tire manufacturing method in accordance with the second embodiment further comprises an operation in which a vulcanizing-type compounding ingredient is added to the pre-addition-of-vulcanizing-type-compounding-ingredient mixture, and in which the vulcanizing-type compounding ingredient is kneaded into the pre-addition-of-vulcanizing-type-compounding ingredient is kneaded into the pre-addition-of-vulcanizing-type-compounding-ingredient mixture to obtain a rubber composition. Regarding this, the description given at the first embodiment is incorporated here.

A tire manufacturing method in accordance with the second embodiment comprises an operation in which a green tire provided with unvulcanized rubber sheeting made up of the rubber composition is made, and in which this is vulcanized and molded to obtain a tire. Vulcanization and molding of this unvulcanized rubber sheeting produces rubber sheeting 15, described above. Vulcanization and molding of this unvulcanized rubber sheeting may also produce rubber sheeting 20, and/or rubber padding 14, described above. Regarding tire structure, the description given at the first embodiment is incorporated here.

WORKING EXAMPLES

Working examples in accordance with the present disclosure are described below.

Raw materials and reagents are indicated below.

| | |
|---|---|
| Natural rubber latex (dry rubber content = 31.2%) | Manufactured by Golden Hope |

-continued

| | |
|---|---|
| Coagulant | Formic acid (reagent-grade 85%) manufactured by Nacalai Tesque, Inc. (diluted to obtain 10% solution and pH adjusted to 1.2 prior to use) |
| Natural rubber | RSS #3 |
| Carbon black | "SEAST 3" manufactured by Tokai Carbon Co., Ltd. (N330) |
| Compound 1 | (2Z)-4-[(4-aminophenyl)amino]-4-oxo-2-butene acid sodium (compound according to Formula (I')) manufactured by Sumitomo Chemical Co., Ltd. |
| Flowers of zinc | "Zinc Oxide No. 3" manufactured by Mitsui Mining & Smelting Co., Ltd. |
| Phenolic resin | "Sumikanol 620" (resorcinol-alkylphenol-formalin copolymer resin) manufactured by Sumitomo Chemical Co., Ltd. |
| Antioxidant | "6PPD" (N-phenyl-N'-(1,3-dimethylbutyl)-p-phenylenediamine) manufactured by Monsanto Company |
| Insoluble sulfur | "Crystex OT-20" manufactured by Akzo |
| Vulcanization accelerator | "NOCCELER DZ-G" (N,N-dicyclohexyl-2-benzothiazolylsulfenamide) manufactured by Ouchi Shinko Chemical Industrial Co., Ltd. |
| Hexamethoxy-methylmelamine | "Sairettsu 963L" manufactured by Nihon Cytec Industries Inc. |

Preparation of Wet Master Batch at Working Examples 1 Through 9

Water was added at 25° C. to concentrated natural rubber latex to obtain a dilute natural rubber latex having a solids (rubber) concentration that was 0.52 mass %, and a natural rubber latex having a solids (rubber) concentration that was 28 mass %. 50 parts by mass of carbon black was added to 954.8 parts by mass of the dilute natural rubber latex, and a ROBO MIX manufactured by PRIMIX Corporation was used to agitate the post-addition-of-carbon-black dilute natural rubber latex to obtain a carbon black/natural rubber slurry. The carbon black/natural rubber slurry was added to the natural rubber latex having the solids (rubber) concentration that was 28 mass % in accordance with TABLE 1, and a mixer for household use manufactured by SANYO was used to agitate the post-addition-of-carbon-black/natural-rubber-slurry natural rubber latex at 11300 rpm for 30 min to obtain a pre-coagulation rubber latex. Formic acid serving as coagulant was added to the pre-coagulation rubber latex in an amount sufficient to achieve a pH of 4, a filter was used to separate the coagulum from waste liquid, and the amount of water in the coagulum was adjusted to be the value shown at TABLE 1. Compound 1 was added to the coagulum, and Compound 1 was dispersed within the coagulum as a Model V-01 screw press (squeezer-type single-screw dewatering extruder) manufactured by Suehiro EPM Corporation was used to dewater/plasticize at 200° C. the post-addition-of-Compound-1 coagulum. As a result of the foregoing procedure, a wet master batch was obtained.

Preparation of Wet Master Batch at Comparative Example 3

Except for the fact that the coagulum was substantially completely dewatered prior to addition of the Compound 1 to the coagulum, a procedure identical to that of Working Example 1 was used to prepare the wet master batch of Comparative Example 3.

Preparation of Wet Batch at Comparative Example 4

Except for the fact that Compound 1 was not added to the coagulum, a procedure identical to that of Working Example 1 was used to obtain the wet master batch of Comparative Example 4.

Preparation of Unvulcanized Rubber at the Various Examples

The compounding ingredients except for sulfur and vulcanization accelerator were added in accordance with TABLE 1, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Preparation of Radial Tires at Working Examples 1 Through 5 and Comparative Examples 1 Through 4

Unvulcanized rubber was molded into sheet form to obtain rubber sheeting. Rubber sheeting was arranged at Mounting Locations A, and a green tire was vulcanized and molded to obtain a radial tire of tire size 11R22.5 14PR that was provided with steel chafers, steel plies, and so forth.

Preparation of Radial Tire at Working Example 6

Unvulcanized rubber was molded into sheet form to obtain rubber sheeting. Rubber sheeting was arranged at Mounting Locations A, Mounting Location B, and Mounting Location C, and a green tire was vulcanized and molded to obtain a tire of tire size 11R22.5 14PR that was provided with steel chafers, steel plies and so forth.

Preparation of Radial Tire at Working Example 7

Unvulcanized rubber was molded into sheet form to obtain rubber sheeting. Rubber sheeting was arranged at Mounting Location D and Mounting Location E, and a green tire was vulcanized and molded to obtain a radial tire of tire size 11R22.5 14PR that was provided with steel chafers, steel plies, and so forth.

Preparation of Radial Tire at Working Example 8

Unvulcanized rubber was molded into sheet form to obtain rubber sheeting. Rubber sheeting was arranged at Mounting Location B, Mounting Location C, Mounting Location D, and Mounting Location F, and a green tire was vulcanized and molded to obtain a radial tire of tire size 11R22.5 14PR that was provided with steel chafers, steel plies, and so forth.

Preparation of Radial Tire at Working Example 9

Unvulcanized rubber was molded into sheet form to obtain rubber sheeting. Rubber sheeting was arranged at Mounting Location A, Mounting Location B, Mounting Location C, and Mounting Location F, and a green tire was vulcanized and molded to obtain a radial tire of tire size 11R22.5 14PR that was provided with steel chafers, steel plies, and so forth.

Mounting Locations A indicate the two locations of rubber sheeting 15 and rubber sheeting 16 in the first embodiment. At each location, rubber sheeting of thickness 1.5 mm and width 25 mm was employed. At each location, the rubber sheeting was arranged along the entire circumference in the tire circumferential direction so as to extend for a width of 15 mm toward the tread from the end of the upturned portion of the steel chafer and so as to extend 10 mm toward the bead toe from the end of the upturned portion of the steel chafer.

Mounting Location B indicates the location of rubber sheeting 17 in the first variation. At Mounting Location B, rubber sheeting of thickness 1.5 mm and width 45 m was employed. At Mounting Location B, the rubber sheeting was arranged along the entire circumference in the tire circumferential direction so as to extend for a width of 30 mm toward the tread from the end of the outer upturned portion of the steel chafer and so as to extend 15 mm toward the bead toe from the end of the outer upturned portion of the steel chafer.

Mounting Location C indicates the location of rubber sheeting 18 in the first variation. At Mounting Location C, rubber sheeting of thickness 1.5 mm and width 45 mm was employed. At Mounting Location C, the rubber sheeting was arranged along the entire circumference in the tire circumferential direction so as to extend for a width of 30 mm toward the tread from the end of the inner upturned portion of the steel chafer and so as to extend 15 mm toward the bead toe from the end of the inner upturned portion of the steel chafer.

Mounting Location D indicates the location of rubber sheeting 19 in the second variation. At Mounting Location D, rubber sheeting of thickness 0.5 mm and width 20 mm was used to enclose the outer end of the steel chafer. More specifically, the rubber sheeting was arranged along the entire circumference in the tire circumferential direction so as to extend from the outer end of the steel chafer toward the bead toe for a width of 10 mm on the bead filler side and so as to extend for a width of 10 mm on the rubber chafer side.

Mounting Location E indicates the location of rubber sheeting 20 in the second variation. At Mounting Location E, rubber sheeting of thickness 0.5 mm and width 20 mm was used to enclose the inner end of the steel chafer. More specifically, the rubber sheeting was arranged along the entire circumference in the tire circumferential direction so as to extend from the inner end of the steel chafer toward the bead toe for a width of 10 mm on the bead filler side and so as to extend for a width of 10 mm on the rubber chafer side.

Mounting Location F indicates the location of rubber padding 14 in the first embodiment.

Vulcanized Rubber Fatigue Resistance

The unvulcanized rubber was vulcanized at 150° C. for 30 min. and cracking tests were carried out in accordance with JIS K6260. Results are shown as indexed relative to a value of 100 for Comparative Example 1. The larger the value the better the fatigue resistance.

Tire Endurance

A drum-type testing machine was employed to spin the tire at an internal air pressure of 0.9 MPa, a load of 5400 kg, and a speed of 40 km/hr, and the running time to cause failure of the bead was measured. Running time to cause failure of the bead is shown as indexed relative to a value of 100 for Comparative Example 1. The larger the value the longer the running time to cause bead failure. It is fair to say that a value of 110 or more is indicative of large effect in terms of improvement of endurance.

TABLE 1

| | | | Comparative Example 1 | Comparative Example 2 | Comparative Example 3 | Comparative Example 4 | Working Example 1 | Working Example 2 | Working Example 3 |
|---|---|---|---|---|---|---|---|---|---|
| Manufacture wet master batch | Parts by mass | Natural rubber (solids content) | — | — | 100 | 100 | 100 | 100 | 100 |
| | | Carbon black | — | — | 50 | 50 | 50 | 50 | 50 |
| | | Compound 1 | — | — | 3 | — | 3 | 3 | 3 |
| | Water content (parts by mass) of coagulum at time of addition of Compound 1 | | — | — | — | 612 | 612 | 8 | 21700 |
| | Wa/Wb | | — | — | — | — | 204 | 2.7 | 7230 |
| Manufacture unvulcanized rubber | Parts by mass | Natural rubber (RSS #3) | 100 | 100 | — | — | — | — | — |
| | | Wet master batch | — | — | 153 | 150 | 153 | 153 | 153 |
| | | Carbon black | 50 | 50 | — | — | — | — | — |
| | | Compound 1 | — | 3 | — | 3 | — | — | — |
| | | Flowers of zinc | 8 | 8 | 8 | 8 | 8 | 8 | 8 |
| | | Phenolic resin | 2 | 2 | 2 | 2 | 2 | 2 | 2 |
| | | Antioxidant | 2 | 2 | 2 | 2 | 2 | 2 | 2 |
| | | Insoluble sulfur | 4.5 | 4.5 | 4.5 | 4.5 | 4.5 | 4.5 | 4.5 |
| | | Vulcanization accelerator | 1 | 1 | 1 | 1 | 1 | 1 | 1 |
| | | Hexamethoxymethylmelamine | 4 | 4 | 4 | 4 | 4 | 4 | 4 |
| Vulcanized rubber | | | | | | | | | |
| Fatigue resistance | | | 100 | 85 | 113 | 109 | 132 | 126 | 124 |
| Tire | | | | | | | | | |
| Rubber sheeting mounting location | | | A | A | A | A | A | A | A |
| Endurance (time to cause bead failure) | | | 100 | 92 | 106 | 103 | 114 | 112 | 112 |

| | | | Working Example 4 | Working Example 5 | Working Example 6 | Working Example 7 | Working Example 8 | Working Example 9 |
|---|---|---|---|---|---|---|---|---|
| Manufacture wet master | Parts by mass | Natural rubber (solids content) | 100 | 100 | 100 | 100 | 100 | 100 |
| | | Carbon black | 50 | 50 | 50 | 50 | 50 | 50 |
| | | Compound 1 | 0.5 | 5 | 3 | 3 | 3 | 3 |

TABLE 1-continued

| | | | | | | | | |
|---|---|---|---|---|---|---|---|---|
| batch | | Water content (parts by mass) of coagulum at time of addition of Compound 1 | 602 | 620 | 612 | 612 | 612 | 612 |
| | | Wa/Wb | 1204 | 124 | 204 | 204 | 204 | 204 |
| Manufacture unvulcanized rubber | Parts by mass | Natural rubber (RSS #3) | — | — | — | — | — | — |
| | | Wet master batch | 150.5 | 155 | 153 | 153 | 153 | 153 |
| | | Carbon black | — | — | — | — | — | — |
| | | Compound 1 | — | — | — | — | — | — |
| | | Flowers of zinc | 8 | 8 | 8 | 8 | 8 | 8 |
| | | Phenolic resin | 2 | 2 | 2 | 2 | 2 | 2 |
| | | Antioxidant | 2 | 2 | 2 | 2 | 2 | 2 |
| | | Insoluble sulfur | 4.5 | 4.5 | 4.5 | 4.5 | 4.5 | 4.5 |
| | | Vulcanization accelerator | 1 | 1 | 1 | 1 | 1 | 1 |
| | | Hexamethoxy-methylmelamine | 4 | 4 | 4 | 4 | 4 | 4 |
| Vulcanized rubber | | Fatigue resistance | 118 | 122 | 132 | 132 | 132 | 132 |
| Tire | | Rubber sheeting mounting location | A | A | A + B + C | D + E | B + C + D + E | A + B + C + F |
| | | Endurance (time to cause bead failure) | 110 | 111 | 118 | 123 | 125 | 143 |

Working Example 1 had better fatigue resistance and endurance than Comparative Example 3, Comparative Example 3 being an example in which the coagulum was completely dewatered prior to addition of Compound 1 thereto. Working Example 1 also had better fatigue resistance and endurance than Comparative Example 4. Comparative Example 4 being an example in which Compound 1 was added during nonproduction kneading

The invention claimed is:

1. A tire manufacturing method comprising:
an operation in which a master batch is made;
an operation in which the master batch is used to make a rubber composition; and
an operation in which a green tire is made, the green tire being provided with
a bead filler,
a carcass ply comprising a turnup disposed at a location toward an exterior in the tire width direction from the bead filler,
a chafer comprising a chafer end disposed at a location toward the exterior in the tire width direction from the turnup, and
unvulcanized rubber sheeting that is made up of the rubber composition and that comprises a connecting portion which is disposed at a location between the turnup and the chafer end;
wherein the operation in which the master batch is made comprises
an operation in which carbon-black-containing pre-coagulation rubber latex in which at least carbon black is dispersed in water is coagulated to obtain a coagulum which contains the water derived from the carbon-black-containing pre-coagulation rubber latex;
an operation in which a compound according to Formula (I), below, is added to the coagulum; and
an operation in which the compound is dispersed within the coagulum;

wherein Formula (I) is given by

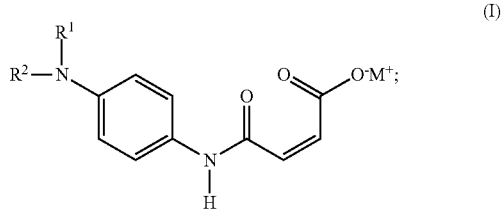

and
wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;
$R^1$ and $R^2$ may be the same or different; and
$M^+$ indicates sodium ion, potassium ion, or lithium ion,
wherein the operation in which the compound is dispersed within the coagulum is an operation in which the compound is dispersed within the coagulum as the coagulum is being dewatered.

2. A tire manufacturing method comprising:
an operation in which a master batch is made;
an operation in which the master batch is used to make a rubber composition; and
an operation in which a green tire is made, the green tire being provided with
a bead filler,
a carcass ply comprising a turnup disposed at a location toward an exterior in the tire width direction from the bead filler,
a chafer comprising a chafer end disposed at a location toward the exterior in the tire width direction from the turnup, and
unvulcanized rubber sheeting that is made up of the rubber composition and that comprises a connecting portion which is disposed at a location between the turnup and the chafer end;
wherein the operation in which the master batch is made comprises an operation in which carbon-black-containing pre-coagulation rubber latex in which at least carbon black is dispersed in water is coagulated to obtain a coagulum which contains the water derived from the carbon-black-containing pre-coagulation rubber latex;

an operation in which a compound according to Formula (I), below, is added to the coagulum; and an operation in which the compound is dispersed within the coagulum;

wherein Formula (I) is given by

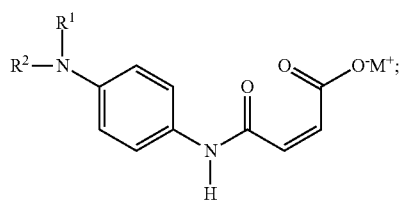

and wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;

$R^1$ and $R^2$ may be the same or different; and $M^+$ indicates sodium ion, potassium ion, or lithium ion, wherein at the operation in which the compound is added to the coagulum, taking the amount of water in the coagulum for every 100 parts by mass of rubber within the coagulum to be Wa, and taking the amount of the compound that is added for every 100 parts by mass of rubber within the coagulum to be Wb, Wa/Wb, being the ratio of Wa to Wb, is in a range that is 1 to 8100.

3. The tire manufacturing method according to claim 1 wherein a thickness of the unvulcanized rubber sheeting is not less than 0.1 mm.

* * * * *